United States Patent
Choi et al.

(10) Patent No.: US 8,316,433 B2
(45) Date of Patent: Nov. 20, 2012

(54) METHOD AND SYSTEM FOR PREVENTING IPV6 PACKET FORGERY IN IPV6-IPV4 NETWORK OF DSTM ENVIRONMENT

(75) Inventors: Wook Choi, Hwaseong-si (KR); Tae-Shik Shon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1060 days.

(21) Appl. No.: 11/707,276

(22) Filed: Feb. 16, 2007

(65) Prior Publication Data

US 2007/0208935 A1   Sep. 6, 2007

(30) Foreign Application Priority Data

Feb. 18, 2006 (KR) .................. 10-2006-0015948

(51) Int. Cl.
*H04L 29/06* (2006.01)

(52) U.S. Cl. ............. 726/14; 709/245; 370/395.54

(58) Field of Classification Search .................. None
See application file for complete search history.

(56) References Cited

U.S. PATENT DOCUMENTS

| 7,367,046 | B1 * | 4/2008 | Sukiman et al. ............ 726/2 |
| 2004/0162909 | A1 | 8/2004 | Choe et al. |
| 2004/0199666 | A1 * | 10/2004 | King et al. ............ 709/238 |
| 2006/0133373 | A1 | 6/2006 | Paik et al. |
| 2007/0136601 | A1 * | 6/2007 | Kwon et al. ............ 713/182 |

FOREIGN PATENT DOCUMENTS

| JP | 2003-338826 | 11/2003 |
| JP | 2004-104664 | 4/2004 |
| JP | 2004-254318 | 9/2004 |
| JP | 2004-260818 | 9/2004 |
| JP | 2004-348206 | 12/2004 |
| JP | 2006-180480 | 7/2006 |
| KR | 2003-0092322 | 12/2003 |
| KR | 10-2004-0074436 | 5/2004 |
| KR | 10-2005-0074998 | 7/2005 |

OTHER PUBLICATIONS

Korean Decision of Grant corresponding to Korean Patent Application No. 10-2006-0015948, issued on Jul. 16, 2007.
E. Nordmark, et al., entitled "Basic Transition Mechanisms for IPv6 Hosts and Routers" IETF, draft-ietf-v6ops-mech-v2-02.txt, drafted on Jan. 30, 2004.

(Continued)

*Primary Examiner* — Gilberto Barron, Jr.
*Assistant Examiner* — Shaun Gregory
(74) *Attorney, Agent, or Firm* — H.C. Park & Associates, PLC (57) ABSTRACT

In a method and system for preventing IPv6 packet forgery in an Internet Protocol version 6 (IPv6)-Internet Protocol version 4 (IPv4) network of a dual stack transition mechanism (DSTM) environment, a DSTM server receives a request for assignment of an IPv4 address from a DSTM node. The DSTM server determines whether the request is reasonable using a previously stored dynamic address table, assigns the IPv4 address to the DSTM node when the request is reasonable, and updates the dynamic address table to have mapping information of the IPv4 address assigned to the DSTM node. The DSTM server then transmits the assigned IPv4 address to the DSTM node, and transmits the updated dynamic address table to a DSTM border router so as to synchronize its dynamic address table with a dynamic address table of the DSTM border router.

18 Claims, 2 Drawing Sheets

OTHER PUBLICATIONS

E. Nordmark, entitled "Stateless IP/ICMP Translation Algorithm (SIIT)" RFC 2765, drafted in Feb. 2000.
G. Tsirtsis, et al., entitled "Network Address Translation-Protocol Translation (NAT-PT)" RFC 2766, drafted in Feb. 2000.
K. Tsuchiya, et al., entitled "Dual Stack Hosts using the "Bump-In-the-Stack" Technique (BIS)", RFC 2767, drafted in Feb. 2000.
S. Lee, et al., entitled "Dual Stack Hosts Using "Bump-in-the-API" (BIA)", RFC 3338, drafted in Oct. 2002.
F. Templin, et al., entitled "Intra-Site Automatic Tunnel Addressing Protocol (ISATAP)", Internet Draft, draft-ietf-ngtrans-isatap-22.txt., drafted on May 26, 2004.
J. Bound, entitled "Dual Stack Transition Mechanim", Internet Draft, draft-bound-dstm-exp-01.txt., drafted in Apr. 2004.
A. Durand, et al., entitled "IPv6 Tunnel Broker", RFC 3053, drafted in Jan. 2001.

* cited by examiner

FIG. 1

METHOD AND SYSTEM FOR PREVENTING IPV6 PACKET FORGERY IN IPV6-IPV4 NETWORK OF DSTM ENVIRONMENT

CLAIM OF PRIORITY

This application makes reference to, incorporates the same herein, and claims all benefits accruing under 35 U.S.C. §119 from an application for METHOD AND SYSTEM OF PROTECTION IPv6 PACKET FORGERY IN DSTM OF IPv6-IPv4 NETWORK earlier filed in the Korean Intellectual Property Office on the 18$^{th}$ of Feb. 2006 and there duly assigned Ser. No. 10-2006-0015948.

BACKGROUND OF THE INVENTION

1. Technical Field

The present invention relates to a method and system for preventing Internet Protocol version 6 (IPv6) packet forgery in an IPv6-IPv4 network of a dual stack transition mechanism (DSTM) environment.

2. Related Art

The term "Internet Protocol version 6 (IPv6)-Internet Protocol version 4 (IPv4) network" refers to a network in which an IPv6 network and an IPv4 network coexist. The IPv6 network has been proposed to overcome the exhaustion of IPv4 addresses due to extensive use. After the introduction of the newly proposed IPv6 network, the traditional IPv4 network and the new IPv6 network must coexist. The coexistence of the IPv4 network and the IPv6 network will be maintained until the traditional IPv4 network is completely replaced by the IPv6 network. Due to the coexistence of the IPv4 network and the IPv6 network, data communication technologies between the IPv4 network and the IPv6 network are being required.

The communication technologies between the IPv4 network and the IPv6 network are being studied in various fields, such as IPv6/IPv4 dual stack tunneling technology and transition technology. The IPv6/IPv4 tunneling technology includes 6 to 4, dual stack transition mechanism (DSTM), intra site automatic tunnel addressing protocol (ISATAP), TEREDO, and tunnel broker, for example. The transition technology includes network address transition protocol transition (NAT-PT), stateless IPv6-IPv4 translator (SIIT), and bump-in-the-API (BIA), for example. The IPv6/IPv4 transition technologies are being studied in the Internet engineering task force (IETF) v6ops work group (WG).

Among them, DSTM technology refers to a technology in which upgradeable nodes in conventional IPv4 systems are formed in a dual stack structure supporting both IPv4 and IPv6, a node is assigned an IPv6 address to operate as an IPv6 node, and the node is assigned an IPv4 address dynamically each time it desires to communicate with an IPv4 node. The DSTM technology is applicable to the last phase wherein all networks are replaced by IPv6 networks.

Under DSTM environments, a node (hereinafter referred to as a "DSTM node") at a side of an IPv6 network desiring to communicate with the IPv4 network is assigned an IPv4 address by a DSTM server, and communicates with the IPv4 network using the assigned IPv4 address.

However, there may be the following drawbacks in assigning an IPv4 address to the DSTM node.

In order to smoothly communicate with the IPv4 network, the DSTM server is requested to assign an IPv4 address. However, due to an illegal and repetitive request by a wrongful node for the assignment of an IPv4 address, IPv4 addresses may be exhausted in the DSTM server. The reason is that the illegal request for the assignment of the IPv4 address can be repeatedly performed using a forged media access control (MAC) or IPv6 address. Thus, in DSTM environments, a denial-of-service (Dos) attack can be caused by the illegal and repetitive request for the assignment of an IPv4 address using a forged IPv6 packet. The IPv6 packet passing through a tunnel end point (TEP) from the DSTM node and forwarded to the IPv4 network may also be forged. In other words, the DSTM node can communicate with the IPv4 network using an illegal IPv4 address abnormally assigned in response to a request to the DSTM server for the assignment of the IPv4 address.

In the DSTM environment, in order to overcome the drawbacks in assigning the IPv4 address and communicating with the IPv4 network, when a Domain Name System Security Extension (DNSSEC) DHCPv6 server is used as the DSTM server, the use of an authentication message of DHCPv6 has been recommended for a domain name server (DNS). However, these technologies have a drawback in that a security protocol or an encryption technique should be additionally used in the DSTM structure itself.

SUMMARY OF THE INVENTION

It is an object of the present invention to provide a method and system for preventing Internet Protocol version 6 (IPv6) packet forgery in an IPv6-IPv4 network of a dual stack transition mechanism (DSTM) environment, wherein the method and system assign an Internet Protocol version 4 (IPv4) address only to a DSTM node rightfully requesting the assignment of an IPv4 address.

It is another object of the present invention to provide a method and system for preventing IPv6 packet forgery in an IPv6-IPv4 network of DSTM environment so as to prevent the exhaustion of IPv4 address.

It is still another object of the present invention to provide a method and system for preventing IPv6 packet forgery in an IPv6-IPv4 network of a DSTM environment by preventing IPv6 packet forgery without the change of DSTM structure, thereby providing light-weight security service.

According to an aspect of the present invention, a method for preventing IPv6 packet forgery in an IPv6 (Internet Protocol version 6)-IPv4 (Internet Protocol version 4) network of a DSTM (dual stack transition mechanism) environment comprises the steps of: receiving, at a DSTM server, a request for assignment of an IPv4 address from a DSTM node; determining, at the DSTM server, whether the request is reasonable using a previously stored dynamic address table; assigning, at the DSTM server, the IPv4 address to the DSTM node when the request is reasonable, and updating the dynamic address table so as to have mapping information of the IPv4 address assigned to the DSTM node; transmitting, at the DSTM server, the assigned IPv4 address to the DSTM node; and transmitting, at the DSTM server, the updated dynamic address table to a DSTM border router, and synchronizing the dynamic address table with a dynamic address table of the DSTM border router.

Information of the DSTM node comprises at least a media access control (MAC) address and an IPv6 address of the DSTM node.

The step of determining, at the DSTM server, whether the request of the DSTM node is reasonable comprises the steps of: determining, at the DSTM server, whether the dynamic address table comprises s MAC address the same as the MAC address of the DSTM node; when the dynamic address table comprises the MAC address of the DSTM node, comparing the IPv6 address of the DSTM node to an IPv6 address of its dynamic address table paired with the MAC address; and when the IPv6 address of the DSTM node is not the same as the IPv6 address of its dynamic address table, determining that the request of the DSTM node for the IPv4 address assignment is unreasonable.

The step of determining, at the DSTM server, whether the request of the DSTM node is reasonable comprises the steps of: determining, at the DSTM server, whether the dynamic address table comprises the MAC address of the DSTM node; when the dynamic address table does not comprise the MAC address of the DSTM node, determining whether the dynamic address table comprises the IPv6 address of the DSTM node; and when the dynamic address table comprises the IPv6 address of the DSTM node, determining that the request of the DSTM node for the IPv4 address assignment is unreasonable.

The method further comprises the steps of: determining, at the DSTM border router, whether a received packet is a reasonable packet, using its dynamic address table synchronized with the dynamic address table of the DSTM server; and forwarding, by the DSTM border router, the packet determined to be a reasonable packet.

The step of determining, at the DSTM border router, whether the received packet is a reasonable packet comprises the step of determining that the packet is a reasonable packet when the dynamic address table comprises information of the received packet.

The dynamic address table of the DSTM border router and the dynamic address table of the DSTM node further comprise a timeout item and a marker item.

The method further comprises the step of determining, at the DSTM border router, that the DSTM node is an unreasonable node when a packet is not received from the DSTM node indicated by its dynamic address table within a timeout period assigned to the DSTM node.

The method further comprises the step of deleting, at the DSTM border router, from its dynamic address table information of the DSTM node determined to be unreasonable as a result of the timeout check, and transmitting the deleted information of the DSTM node to the DSTM server so as to synchronize its dynamic address table with the dynamic address table of the DSTM server.

The method further comprises the step of, at the DSTM border router, when reception of the packet from the DSTM node is performed within the timeout period assigned to the DSTM node, setting a predetermined value to the marker item of its dynamic address table associated with the DSTM node.

The method further comprises the step of canceling the assignment of the IPv4 address when the DSTM server receives, from the DSTM node assigned the IPv4 address, a notification that the DSTM node has not requested the assignment of the IPv4 address.

According to another aspect of the present invention, a system for preventing IPv6 packet forgery in an IPv6-IPv4 network in a DSTM environment comprises: a DSTM border router for authenticating a packet received from a DSTM node on the basis of a dynamic address table comprising information of the DSTM node and mapping information of an IPv4 address assigned to the DSTM node, and for forwarding the authenticated packet; and a DSTM server responsive to receipt of a request for assignment of the IPv4 address from the DSTM node for determining whether the request is reasonable, for assigning the IPv4 address to the DSTM node, for updating its previously stored dynamic address table to have the information of the DSTM node and the mapping information of the IPv4 address assigned to the DSTM node, and for providing the updated dynamic address table to the DSTM border router so as to synchronize its dynamic address table with the dynamic address table of the DSTM border router.

When the DSTM server includes a MAC address the same as the MAC address of the DSTM node in its dynamic address table, and the IPv6 address of the dynamic address table paired with the MAC address is not the same as the IPv6 address of the DSTM node, the DSTM server determines the request of the DSTM node to be an unreasonable request.

When the MAC address of the DSTM node is not included in the dynamic address table of the DSTM server but the IPv6 address of the DSTM node is included, the DSTM server determines the request of the DSTM node to be an unreasonable request.

The DSTM border router checks on each of the DSTM nodes of its dynamic address table as to whether a packet from the DSTM node is received within predetermined timeout period assigned to the DSTM node, and determines the DSTM node to be an unreasonable node when the packet from the DSTM node is not received within the timeout period.

The DSTM border router deletes information of the DSTM node, determined to be unreasonable as a result of the timeout check, from its dynamic address table, and provides the deleted information of the DSTM node to the DSTM server.

As described above, the method and system for preventing IPv6 packet forgery in the IPv6-IPv4 network of the DSTM environment prevent the forgery of an IPv6 packet using the dynamic address table (DAT).

DSTM technology refers to technology in which, in conventional IPv4 systems, upgradeable nodes are provided in a dual stack mechanism environment, and the node is assigned an IPv6 address to communicate with a genuine IPv4 node. It is desirable that the DSTM technology be applied to the last stage in which all networks change to IPv6. The DSTM technology can be used for communication between a host of an IPv6 network and a host of an isolated IPv4 network.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention will be described in detail with reference to the accompanying drawings. In the following description, a detailed description of known functions and configurations incorporated herein has been omitted for conciseness.

Figure 1:
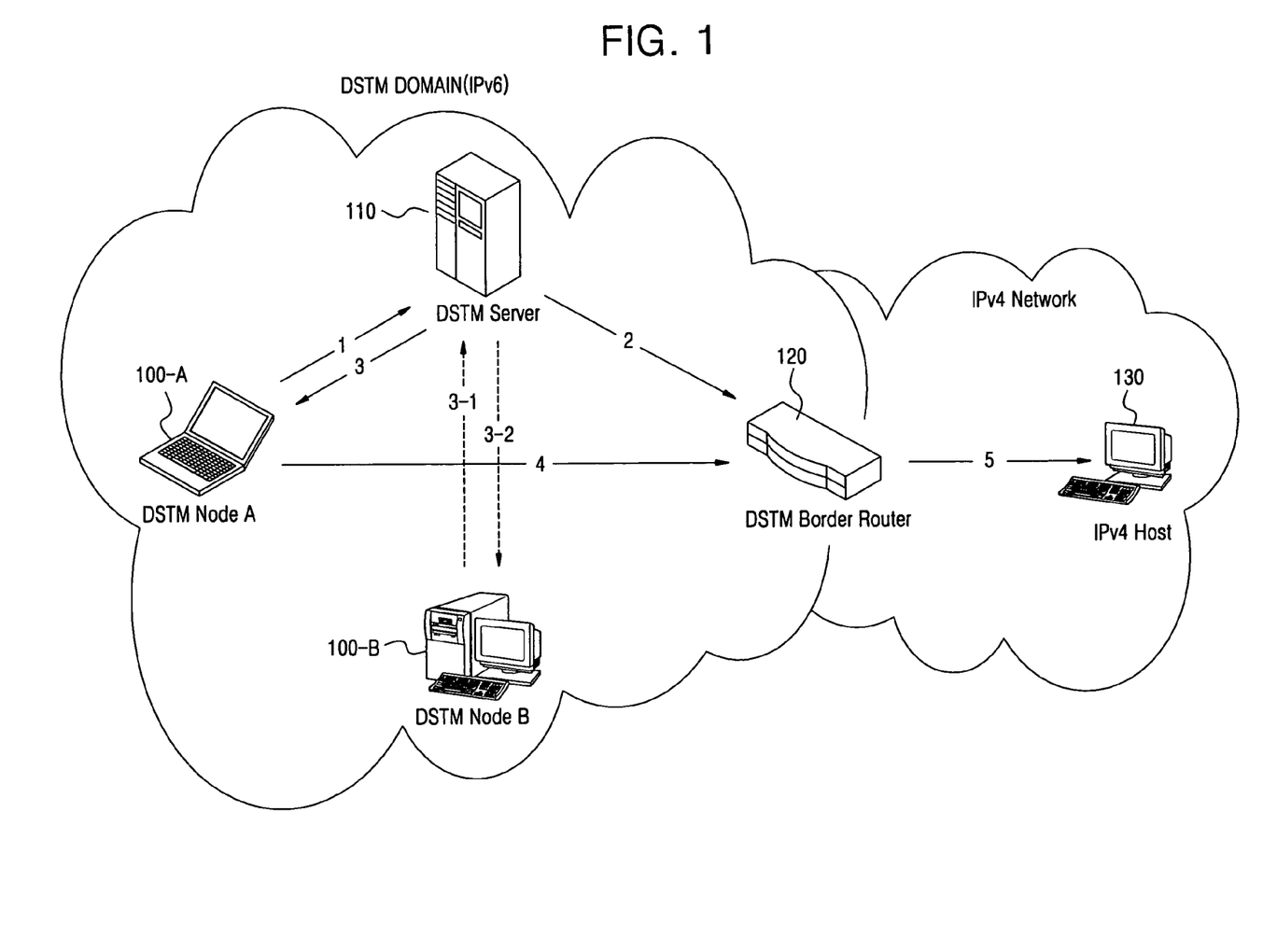
FIG. 1 illustrates the construction of an Internet Protocol version 6 (IPv6)-Internet Protocol version 4 (IPv4) network in a dual stack transition mechanism (DSTM) environment according to an exemplary embodiment of the present invention.

FIG. 1 illustrates the construction of an Internet Protocol version 06 (IPv6)-Internet Protocol version 4 (IPv4) network in a dual stack transition mechanism (DSTM) environment according to an exemplary embodiment of the present invention.

As shown in FIG. 1, the IPv6-IPv4 network of the DSTM environment can include at least one DSTM node 100-A and 100-B, a DSTM server 110, a DSTM border router (BR) 120, and at least one IPv4 host 130. FIG. 1 is only an example suggested for an understanding of the present invention, and the present invention is applicable to various types of IPv6-IPv4 networks in a DSTM environment.

The DSTM node 100-A or 100-B, a constituent element of an IPv6 network, can request the DSTM server 110 to assign an IPv4 address for communication with an IPv4 network, and can communicate with the IPv4 host 130 in the IPv4 network domain using the IPv4 address assigned by the DSTM server 110.

The DSTM server 110 performs a domain name server (DNS) function for obtaining position information of a destination IPv4 node, a dynamic host configuration protocol version 6 (DHCPv6) function associated with the assignment of the IPv4 address necessary for communication with the IPv4 host 130, and an IPv4 address pool function.

Upon receipt of a request for the assignment of an IPv4 address from the DSTM node 100-A or 100-B, the DSTM server 110 assigns the IPv4 address to the DSTM node 100-A or 100-B. The DSTM server 110 determines whether the request for IPv4 address assignment from the DSTM node 100-A or 100-B is a reasonable request, i.e., a request according to normal procedure from the DSTM node 100-A or 100-B in a domain of the DSTM server 110. If the assignment request is reasonable, the DSTM server 110 assigns the IPv4 address to the DSTM node 100-A or 100-B, but otherwise does not assign the IPv4 address.

In particular, the DSTM server 110 uses a dynamic address table to determine whether the IPv4 address request from the DSTM node 100-A or 100-B is a reasonable request. The dynamic address table can include current IPv4 address assignment state information of the DSTM server 110. In other words, the dynamic address table can include information on the DSTM nodes currently assigned the IPv4 address, and information on the mapping relationship of an assigned IPv4 address to each node.

The dynamic address table used by the DSTM server 110 according to the present invention will be described with reference to Table 1.

TABLE 1

| Index | MAC address | IPv6 address | IPv4 address | Timeout | Marker |
|---|---|---|---|---|---|
| 1 | | | | | |
| 2 | | | | | |
| ... | | | | | |
| n | | | | | |

Table 1 shows an example of a structure of the dynamic address table. As shown in Table 1, the inventive dynamic address table can include an IPv4 address assigned by the DSTM server 110 to the DSTM node 110-A or 100-B, together with a media access control (MAC) address and an IPv6 address which is information of the DSTM node assigned the IPv4 address. The dynamic address table can further include a timeout and a marker assigned to each DSTM node 110-A or 100-B. The timeout and the marker are used to determine whether the IPv4 address request from the DSTM node 110-A or 100-B is reasonable. The timeout is checked to determine that an IPv4 address is assigned in response to an unreasonable request when a packet with the IPv4 address is not routed through the DSTM border router 120 within a predetermined time period after the assignment of the IPv4 address. The marker is used to indicate that the request is reasonable after the timeout check is performed.

The timeout check is performed in the DSTM border router 120. The timeout check will be described in detail below when the DSTM border router 120 is described. The dynamic address table of the DSTM server 110 is updated at any time in an IPv4 assignment process, and is synchronized to have the same content as a dynamic address table of the DSTM border router 120.

The dynamic address table of the DSTM server 110 is configured and updated by the DSTM server 110. An example in which the DSTM server 110 updates the dynamic address table will be described. An example in which the DSTM server 110 determines, using the dynamic address table, whether a request for IPv4 address assignment from the DSTM node is reasonable will also be described. To assist in understanding the present invention, it is assumed that an IPv4 address is assigned in response to a request for IPv4 address assignment from the DSTM node A 100-A.

First, updating of the dynamic address table will be described.

Upon receipt of a request for IPv4 address assignment from the DSMT node A 100-A, the DSTM server 110 determines whether the request is reasonable. That is, the DSTM server 110 uses the dynamic address table to determine whether the request from the DSTM node A 100-A is reasonable.

The DSTM server 110 compares information of the DSTM node A 100-A with previously stored information in the dynamic address table, and determines whether the request of the DSTM node A (100-A) is reasonable. The information of the DSTM node A 100-A used by the DSTM server 110 is transmitted, together with the IPv4 address assignment request, to the DSTM server 110.

The process by which the DSTM server 110 determines that the request for IPv4 address assignment is reasonable will be described in detail. The MAC address and the IPv6 address can be used as information of the DSTM node A 100-A.

First, the case wherein IPv4 address assignment is requested using a forged IPv6 address will be described.

The DSTM server 110 determines whether the dynamic address table includes the MAC address of the DSTM node A 100-A requesting IPv4 address assignment, that is, the same MAC address as the MAC address of the DSTM node A 100-A. If the dynamic address table includes the MAC address of the DSTM node A 100-A, the DSTM server 11O determines whether the IPv6 address of the dynamic address table paired with the MAC address is the same as the IPv6 address of the DSTM node A 100-A. If the IPv6 address is a forged address, the two IPv6 addresses will be different from each other. If so, the DSTM server 11O determines that the request of the DSTM node A 100-A is unreasonable. When a predetermined MAC address-IPv6 address pair is included in the dynamic address table, upon receipt of the request for the IPv4 address assignment from the DSTM node having the same address pair as the MAC address-IPv6 address pair, the DSTM server 11O rejects the request. The reason is that one MAC address-IPv6 address pair can be assigned only one IPv4 address.

The case wherein IPv4 address assignment is requested using a forged MAC address will now be described.

When the DSTM server 100 does not include the MAC address of the DSTM node A 100-A in its dynamic address table, it searches the dynamic address table, and determines whether the dynamic address table includes the IPv6 address of the DSTM node A 100-A. If the dynamic address table does not include the MAC address of the DSTM node A 100-A and includes only the IPv6 address of the DSTM node A 100-A, the DSTM server 110 determines that the request of the DSTM node A 100-A is unreasonable.

The case wherein the IPv4 address assignment is requested using a forged MAC address and a forged IPv6 address will be described.

When the DSTM server 110 does not include both the MAC address and the IPv6 address of the DSTM node A 100-A in the dynamic address table, it determines that the request for IPv4 address assignment from the DSTM node A 100-A is reasonable. If so, the DSTM server 110 assigns the IPv4 address to the DSTM node A 100-A. The DSTM server 110 then transmits the assigned IPv4 address to the DSTM node A 100-A.

When the request for IPv4 address assignment checked in the DSTM server 110 as being received from the DSTM node A 100-A is really an unreasonable request for IPv4 address assignment from the DSTM node A 100-A, a node forging the MAC address and the IPv6 address and illegally requesting IPv4 address assignment cannot receive the assigned IPv4 address. The reason is that a MAC cache poisoning attack is basically impossible in an IPv6 environment.

When the forged MAC address is not in the domain of the DSTM server 110, the IPv4 address assigned to the MAC address cannot be transmitted to the MAC address. Even though the forged MAC address is in the domain of the DSTM server 110, other nodes cannot recognize the IPv4 address assigned by the DSTM server 110 since the IPv4 address is encrypted using an Internet Protocol Security (IPSec) and is transmitted.

In other words, the IPv4 address assigned in response to the request for IPv4 address assignment using the forged MAC and IPv6 addresses is not transmitted to the requesting node. Thus, packet transmission based on the IPv4 address assigned in response to an unreasonable request for IPv4 address assignment will not be performed. In other words, if the DSTM node assigned the IPv4 address does not transmit a packet using the IPv4 address within a predetermined period of time, the request for IPv4 address assignment from the DSTM node is considered to be an unreasonable request.

It is timeout information of the dynamic address table which is used to check the above case. The timeout check using the timeout information is performed in the DSTM border router 120.

Upon receipt of the packet, the DSTM border router 120 performs an authentication process to determine whether the packet is a reasonable packet, and forwards the packet determined to be a reasonable packet. The DSTM border router 120 uses its dynamic address table to authenticate the received packet. Upon receipt of the packet, the DSTM border router 120 searches the dynamic address table, and determines whether the dynamic address table includes the information of the DSTM node transmitting the received packet. If the DSTM border router 120 includes the information of the transmitting DSTM node in the dynamic address table, it determines that the packet received from the DSTM node is a reasonable packet.

The packet determined in the DSTM border router 120 to be a reasonable packet can include a packet transmitted using the IPv4 address assigned by the DSTM server 110. In other words, the DSTM border router 20 must recognize the IPv4 address information assigned by the DSTM server 110 in order to authenticate the received packet. The DSTM border router 120 recognizes the IPv4 address information assigned by the DSTM server 110 through synchronization of the dynamic address table of the DSTM border router 120 with the dynamic address table of the DSTM server 110. For the purpose of synchronization of the two dynamic address tables, when the dynamic address table of the DSTM server 110 is updated, the updated dynamic address table of the DSTM server 110 is provided to the DSTM border router 120, and when the dynamic address table of the DSTM border router 120 is updated, the updated dynamic address table of the DSTM border router 120 is provided to the DSTM server 110. For the purpose of synchronization of the two dynamic address tables, it is preferable that only data updated through deletion or addition be exchanged, rather than exchanging an entire updated dynamic address table between the DSTM server 110 and the DSTM border router 120.

When the DSTM border router 120 does not include the information of the received packet (for example, information of the DSTM node receiving the packet) in the dynamic address table, or when the information of the packet does not match the information of the dynamic address table, the DSTM border router 120 determines that the packet is an unreasonable packet. The term "unreasonable packet" means that the packet is not a packet transmitted using the IPv4 address rightly assigned by the DSTM server 110. The DSTM border router 120 notifies the DSTM server 110 of the IPv4 address assignment executed without a reasonable request for IPv4 address assignment, and prevents the exhaustion of IPv4 addresses of the DSTM server 110.

As stated above, the DSTM border router 120 performs the timeout check in its dynamic address table. When the DSTM border router 120 has an IPv4 address which is assigned but not used to transmit the packet before the lapse of a predetermined period time, it determines that the IPv4 address is assigned in response to an unreasonable request. The timeout period is set in consideration of a system characteristic, such as the total number of assignable IPv4 addresses and the remaining number of currently assignable IPv4 addresses. It is preferable that the timeout period be set by the DSTM server 110 assigning the IPv4 address.

When it is determined from the timeout check that a predetermined IPv4 address is assigned in response to an unreasonable request, the DSTM border router 120 deletes the IPv4 address and information associated with the IPv4 address from its dynamic address table. When the dynamic address table is updated as a result of the timeout check, the DSTM border router 120 provides the updated dynamic address table to the DSTM server 110 so that the dynamic address table is synchronized with the dynamic address table of the DSTM server 110.

In FIG. 1, processes according to the present invention are indicated by arrows.

Process 1 shows that the DSTM node A 100-A requests the DSTM server 110 for an IPv4 address assignment. The DSTM node A 100-A is not a specific node but rather is any DSTM node included in the same domain as that of the DSTM server 110.

The DSTM server 110, receiving the request for IPv4 address assignment from the DSTM node A 100-A, constructs the dynamic address table which maps all of the MAC addresses and the IPv6 addresses of the DSTM node A 100-A requesting the IPv4 address assignment, and the IPv4 address pair assigned to the DSTM node A 100-A. This dynamic address table is subjected to a dynamic updating process based on the MAC address of the DSTM node A 100-A requesting the IPv4 address assignment. In other words, each time the DSTM node A 100-A requests IPv4 address assignment, the DSTM server 110 sequentially checks the redundancy of the MAC address and the IPv6 address of the DSTM node A 100-A in its dynamic address table.

The dynamic address table, as shown in Table 1, can include the MAC address, the IPv6 address, the IPv4 address, timeout information, and the marker. The timeout information is used for the timeout check as explained above. When a packet is routed by the DSTM border router 120 within the timeout period, the marker is set and the timeout is disregarded. In general, upon passing the timeout check, the marker is set to "1", but its value may be changed depending on setting of the system.

In process 2, the DSTM server 110 generating the dynamic address table in response to the DSTM node's request for the IPv4 address shares its dynamic address table together with the dynamic address table of the DSTM border router 120. This process is performed through the synchronization of the two dynamic address tables. In other words, upon execution of updating, such as deletion, addition, and change in the dynamic address tables, the DSTM server 110 and the DSTM border router 120 provide updating information to each other, thereby keeping their dynamic address tables identical with each other.

Process 3 shows that the DSTM node A 100-A is assigned the requested IPv4 address.

Processes 4 and 5 show that the DSTM node A 100-A having the assigned IPv4 address attempts communication with an IPv4 network through the DSTM border router 120. The DSTM border router 120 checks the propriety of the IPv6 packet currently passing through itself using the dynamic address table shared with the DSTM server 110.

Lastly, the processes 3-1 and 3-2 show that, in the DSTM server 110, an IPv4 address assigned in response to an unreasonable request for IPv4 address assignment from a DSTM node having a forged MAC address is transmitted to a DSTM node having the real MAC address. DSTM node B 100-B, assigned the IPv4 address without its request, can send the DSTM server 110 notification (process 3-1) that the address has been assigned without a request for IPv4 address assignment, and can thereby cancel the assigned IPv4. The DSTM server 110 receiving the notification from DSTM node B 100-B cancels the IPv4 address assigned to the DSTM node 100-B.

The processes for preventing IPv6 packet forgery in the IPv6-IPv4 network of the DSTM environment will now be described with reference to FIG. 2.

Figure 2:
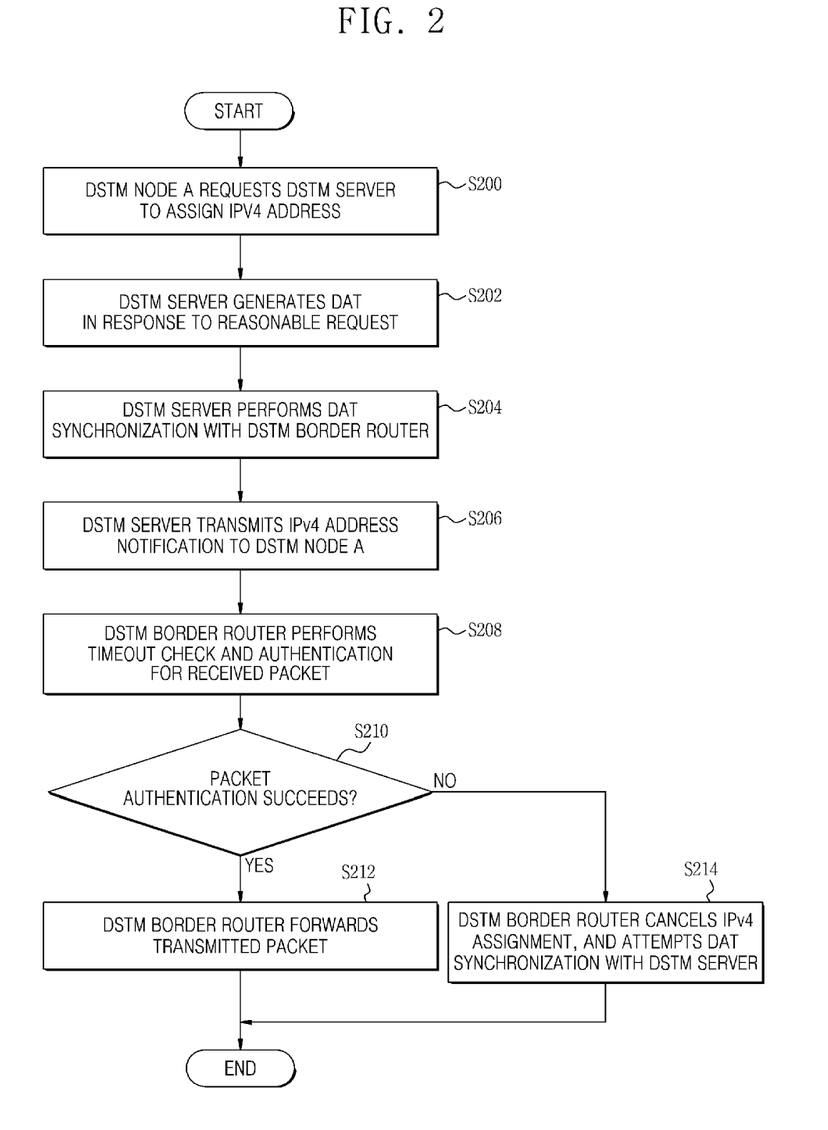
FIG. 2 is a flowchart of a method for preventing IPv6 packet forgery in an IPv6-IPv4 network in a DSTM environment according to an exemplary embodiment of the present invention.

FIG. 2 is a flowchart of a method for preventing IPv6 packet forgery in the IPv6-IPv4 network in a DSTM environment according to an exemplary embodiment of the present invention.

The DSTM node A requests the DSTM server 110 to assign the IPv4 address (S200). The DSTM server 110, requested to assign the IPv4 address, determines whether the request is reasonable. Upon determination that the request is a reasonable request, the DSTM server 110 assigns the IPv4 address, and updates its dynamic address table (DAT) to contain mapping information of the assigned IPv4 address (S202). The DSTM server 110 performs dynamic address table synchronization with the DSTM border router 120 (S204). The DSTM server 110 notifies the DSTM node A requesting the IPv4 address assignment of the assigned IPv4 address (S206). The DSTM border router 120 performs a timeout check and authentication for the received packet using its dynamic address table (S208). The DSTM border router 120 determines whether the packet authentication has succeeded (S210), and forwards the authenticated packet if authentication has succeeded (S212). If authentication does not succeed, the DSTM border router 120 cancels the IPv4 address assigned to the DSTM node A transmitting the unauthenticated packet, updates its dynamic address table in view of the cancellation result, and synchronizes the dynamic address table with the dynamic address table of the DSTM server 110 (S214).

As described above, in the present invention, the dynamic address table is used to detect an unreasonable request for the assignment of an IPv4 address based on forgery of an IPv6 packet without use of a separate additional security protocol or encryption technique, and the IPv4 address is assigned only in response to a reasonable request for assignment of an IPv4 address, thereby preventing the exhaustion of IPv4 addresses.

As also described above, a method and system for preventing IPv6 packet forgery in an IPv6-IPv4 network in a DSTM environment detect an illegal request for assignment of an IPv4 address using a dynamic address table, and assign the IPv4 address only to a DSTM node justly requesting the assignment of an IPv4 address. Thus, the present invention prevents the forgery of an IPv6 packet, and prevent denial-of-service (DoS) attacks which may occur in the DSTM environment. Moreover, the present invention prevents the exhaustion of IPv4 addresses. The present invention also provides a light-weight security service by preventing the forgery of an IPv6 packet without using an additional protocol or encryption technique.

While the present invention has been described with reference to exemplary embodiments thereof, it will be understood by those skilled in the art that various changes in form and detail may be made therein without departing from the scope of the present invention as defined by the following claims.

What is claimed is:

1. A method to prevent IPv6 packet forgery in an Internet Protocol version 6 (IPv6)-Internet Protocol version 4 (IPv4) network in a dual stack transition mechanism (DSTM) environment, the method comprising:
   receiving, at a DSTM server from a DSTM node, a request for assignment of an IPv4 address;
   determining, at the DSTM server, whether the request is reasonable using a stored dynamic address table;
   assigning, at the DSTM server, the IPv4 address to the DSTM node if the request is reasonable, and updating the dynamic address table to contain mapping information of the IPv4 address assigned to the DSTM node;
   transmitting, at the DSTM server, the assigned IPv4 address to the DSTM node; and
   transmitting, at the DSTM server, the updated dynamic address table to a DSTM border router; and
   synchronizing the dynamic address table of the DSTM server with a dynamic address table of the DSTM border router,
   wherein information of the DSTM node comprises at least a media access control (MAC) address and an IPv6 address of the DSTM node, and
   wherein determining, at the DSTM server, whether the request of the DSTM node is reasonable comprises determining, at the DSTM server, whether the dynamic address table comprises the MAC address and the IPv6 address of the DSTM node.

2. The method according to claim 1, wherein determining, at the DSTM server, whether the request of the DSTM node is reasonable further comprises:
   if the dynamic address table comprises a MAC address the same as the MAC address of the DSTM node, comparing the IPv6 address of the DSTM node with an IPv6 address of the dynamic address table paired with the MAC address of the DSTM node; and
   if the IPv6 address of the DSTM node is not the same as the IPv6 address of the dynamic address table, determining that the request of the DSTM node for assignment of the IPv4 address is unreasonable.

3. The method according to claim 1, wherein determining, at the DSTM server, whether the request of the DSTM node is reasonable further comprises:
if the dynamic address table does not comprise the MAC address of the DSTM node, determining whether the dynamic address table comprises the IPv6 address of the DSTM node; and
if the dynamic address table comprises the IPv6 address of the DSTM node, determining that the request of the DSTM node for assignment of the IPv4 address is unreasonable.

4. The method according to claim 1, further comprising:
determining, at the DSTM border router, whether a received packet is a reasonable packet using the dynamic address table of the DSTM border router synchronized with the dynamic address table of the DSTM server; and
forwarding, by the DSTM border router, the packet determined to be the reasonable packet.

5. The method according to claim 4, wherein determining, at the DSTM border router, whether the received packet is a reasonable packet comprises determining that the packet is the reasonable packet if the dynamic address table comprises information of the received packet.

6. A method to prevent Internet Protocol version 6 (IPv6) packet forgery in an Internet Protocol version 6 (IPv6)-Internet Protocol version 4 (IPv4) network in a dual stack transition mechanism (DSTM) environment, the method comprising:
receiving, at a DSTM server from a DSTM node, a request for assignment of an IPv4 address;
determining, at the DSTM server, whether the request is reasonable using a stored dynamic address table;
assigning, at the DSTM server, the IPv4 address to the DSTM node if the request is reasonable, and updating the dynamic address table to contain mapping information of the IPv4 address assigned to the DSTM node;
transmitting, at the DSTM server, the assigned IPv4 address to the DSTM node; and
transmitting, at the DSTM server, the updated dynamic address table to a DSTM border router; and
synchronizing the dynamic address table of the DSTM server with a dynamic address table of the DSTM border router,
wherein each of the dynamic address table of the DSTM border router and the dynamic address table of the DSTM server comprises a timeout item and a marker item, and
wherein determining, at the DSTM server, whether the request is reasonable comprises determining, at the DSTM server, whether the stored dynamic address table comprises a media access control (MAC) address and an IPv6 address of the DSTM node.

7. The method according to claim 6, further comprising determining, at the DSTM border router, that the DSTM node is an unreasonable node if a packet is not received from the DSTM node within a timeout period corresponding to the timeout item assigned to the DSTM node sending the packet, the timeout period provided by the dynamic address table of the DSTM border router.

8. The method according to claim 7, further comprising setting, at the DSTM border router, a value in the marker item associated with the DSTM node in the dynamic address table of the DSTM border router when the packet is received from the DSTM node within the timeout period assigned to the DSTM node.

9. The method according to claim 7, further comprising deleting, from the dynamic address table of the DSTM border router, information of the DSTM node determined to be unreasonable as a result of a timeout check, and transmitting the deleted information of the DSTM node to the DSTM server to synchronize the dynamic address table of the DSTM border router with the dynamic address table of the DSTM server.

10. The method according to claim 1, further comprising canceling the assignment of the IPv4 address in response to the DSTM server receiving, from the DSTM node assigned the IPv4 address, a notification that the DSTM node does not request the assignment of the IPv4 address.

11. A system to prevent Internet Protocol version 6 (IPv6) packet forgery in an Internet Protocol version 6 (IPv6)-Internet Protocol version 4 (IPv4) network in a dual stack transition mechanism (DSTM) environment, the system comprising:
a DSTM border router to authenticate a packet received from a DSTM node according to a dynamic address table comprising information of the DSTM node and mapping information of an IPv4 address assigned to the DSTM node, and to forward the authenticated packet; and
a DSTM server to respond to receipt of a request from the DSTM node for assignment of the IPv4 address, to determine whether the request is reasonable, to assign the IPv4 address to the DSTM node, to update a stored dynamic address table of the DSTM server to have the information of the DSTM node and the mapping information of the IPv4 address assigned to the DSTM node, and to provide the updated dynamic address table to the DSTM border router to synchronize the dynamic address table of the DSTM server with the dynamic address table of the DSTM border router,
wherein the information of the DSTM node comprises at least a media access control (MAC) address and an IPv6 address of the DSTM node, and
wherein determining whether the request of the DSTM node is reasonable comprises the DSTM server determining whether the dynamic address table comprises the MAC address and the IPv6 address of the DSTM node.

12. The system according to claim 11, wherein if a MAC address the same as the MAC address of the DSTM node is provided in the dynamic address table of the DSTM server, and if an IPv6 address of the dynamic address table paired with the MAC address is not the same as the IPv6 address of the DSTM node, the DSTM server determines that the request of the DSTM node is unreasonable.

13. The system according to claim 11, wherein if the MAC address of the DSTM node is not provided in the dynamic address table of the DSTM server but the IPv6 address of the DSTM node is provided in the dynamic address table of the DSTM server, the DSTM server determines that the request of the DSTM node is unreasonable.

14. A system to prevent Internet Protocol version 6 (IPv6) packet forgery in an Internet Protocol version 6 (IPv6)-Internet Protocol version 4 (IPv4) network in a dual stack transition mechanism (DSTM) environment, the system comprising:
a DSTM border router to authenticate a packet received from a DSTM node according to a dynamic address table comprising information of the DSTM node and mapping information of an IPv4 address assigned to the DSTM node, and to forward the authenticated packet; and a DSTM server to respond to receipt of a request from the DSTM node for assignment of the IPv4 address, to determine whether the request is reasonable, to assign the IPv4 address to the DSTM node, to update a stored dynamic address table of the DSTM server to have information of the DSTM node and the mapping information of the IPv4 address assigned to the DSTM node, and to provide the updated dynamic address table to the DSTM border router to synchronize the dynamic address table of the DSTM server with the dynamic address table of the DSTM border router, wherein each of the dynamic address table of the DSTM border router and the dynamic address table of the DSTM server comprise a timeout item and a marker item, and wherein determining whether the request from the DSTM node is reasonable comprises the DSTM server determining whether the dynamic address table comprises a media access control (MAC) address and an IPv6 address of the DSTM node.

15. The system according to claim 14, wherein the DSTM border router determines whether a packet from the DSTM node is received within a timeout period corresponding to the timeout item assigned to the DSTM node, and determines that the DSTM node is an unreasonable node when the packet from the DSTM node is not received within the timeout period.

16. The system according to claim 15, wherein the DSTM border router deletes, from the dynamic address table of the DSTM border router, information of the DSTM node determined to be unreasonable as a result of a timeout check, and provides the deleted information of the DSTM node to the DSTM server.

17. The system according to claim 15, wherein in response to determining, using a timeout check, that the packet is received from the DSTM node within the timeout period assigned to the DSTM node, the DSTM border router sets a value in the marker item associated with the DSTM node in the dynamic address table of the DSTM border router.

18. The system according to claim 11, wherein in response to the DSTM server receiving, from the DSTM node assigned the IPv4 address, a notification that the DSTM node did not request the assignment of the IPv4 address, the DSTM server cancels the assignment of the IPv4 address.

* * * * *